(12) United States Patent
Park

(10) Patent No.: US 9,967,446 B2
(45) Date of Patent: May 8, 2018

(54) PERSONALIZED SHOPPING MALL SYSTEM USING VIRTUAL CAMERA

(71) Applicant: ITX-M2M Co., Ltd., Seoul (KR)

(72) Inventor: Sang Yeol Park, Seongnam-si (KR)

(73) Assignee: ITX-M2M Co., Ltd., Seoul (KR)

( * ) Notice: Subject to any disclaimer, the term of this patent is extended or adjusted under 35 U.S.C. 154(b) by 0 days. days.

(21) Appl. No.: 15/259,171

(22) Filed: Sep. 8, 2016

(65) Prior Publication Data

US 2017/0070656 A1 Mar. 9, 2017

(30) Foreign Application Priority Data

| Sep. 9, 2015 | (KR) | 10-2015-0127917 |
| Sep. 23, 2015 | (KR) | 10-2015-0134902 |
| Nov. 19, 2015 | (KR) | 10-2015-0162825 |
| Jan. 19, 2016 | (KR) | 10-2016-0006535 |
| Jun. 8, 2016 | (KR) | 10-2016-0071099 |
| Jun. 8, 2016 | (KR) | 10-2016-0071101 |

(51) Int. Cl.

| H04N 7/14 | (2006.01) |
| H04N 5/232 | (2006.01) |
| H04N 5/247 | (2006.01) |
| G06Q 30/06 | (2012.01) |
| G06F 3/00 | (2006.01) |
| G06F 3/01 | (2006.01) |
| G06F 3/03 | (2006.01) |
| G06F 3/0481 | (2013.01) |

(52) U.S. Cl.
CPC ......... *H04N 5/23203* (2013.01); *G06F 3/005* (2013.01); *G06F 3/011* (2013.01); *G06F 3/0304* (2013.01); *G06F 3/04815* (2013.01); *G06Q 30/0613* (2013.01); *H04N 5/23296* (2013.01); *H04N 5/247* (2013.01); *H04N 7/14* (2013.01)

(58) Field of Classification Search
None
See application file for complete search history.

(56) References Cited

U.S. PATENT DOCUMENTS

| 6,141,145 A | 10/2000 | Nalwa |
| 7,823,058 B2 | 10/2010 | Pea et al. |
| 2003/0055745 A1* | 3/2003 | Kim .................. G06Q 30/06 705/26.43 |

(Continued)

FOREIGN PATENT DOCUMENTS

| JP | 2001-51890 A | 2/2001 |
| JP | 2005-6341 A | 1/2005 |

(Continued)

OTHER PUBLICATIONS

Korean Office Action dated Feb. 20, 2017 in corresponding Korean patent application No. 10-2016-0071099 (6 pages in Korean).

(Continued)

*Primary Examiner* — Maria El-Zoobi
(74) *Attorney, Agent, or Firm* — NSIP Law

(57) ABSTRACT

Disclosed is a personalized shopping mall system using a virtual camera, which can make a user feel as if he or she is actually visiting and shopping at the offline shop by creating a virtual camera having a different ROI from an image of the offline shop captured by a physical camera and streaming a shopping mall page including the virtual camera.

21 Claims, 15 Drawing Sheets

(56) References Cited

U.S. PATENT DOCUMENTS

| | | | | |
|---|---|---|---|---|
| 2007/0122058 | A1* | 5/2007 | Kitaura | G06T 7/579 382/284 |
| 2008/0218582 | A1* | 9/2008 | Buckler | H04N 7/15 348/14.08 |
| 2011/0135199 | A1* | 6/2011 | Choi | H04N 1/64 382/166 |
| 2013/0097277 | A1 | 4/2013 | Kim | |
| 2014/0023248 | A1* | 1/2014 | Yoo | G06K 9/00288 382/118 |
| 2014/0199043 | A1* | 7/2014 | Guntur | H04N 21/4728 386/230 |
| 2015/0023407 | A1* | 1/2015 | Sato | H04N 19/44 375/240.02 |
| 2015/0138339 | A1* | 5/2015 | Einecke | H04N 5/23229 348/118 |

FOREIGN PATENT DOCUMENTS

| KR | 10-2001-0025404 A | 4/2001 |
|---|---|---|
| KR | 20-0328504 Y1 | 9/2003 |
| KR | 10-2006-0025518 A | 3/2006 |
| KR | 10-2008-0040807 A | 5/2008 |
| KR | 10-2009-0041192 A1 | 4/2009 |
| KR | 10-2011-0072846 A | 6/2011 |
| KR | 10-1215948 B1 | 12/2012 |
| KR | 10-2013-0039652 A | 4/2013 |
| KR | 10-2014-0092211 A | 7/2014 |
| KR | 10-2014-0126072 A | 10/2014 |
| KR | 10-1484736 B1 | 1/2015 |
| KR | 10-2015-0029324 A | 3/2015 |

OTHER PUBLICATIONS

Korean Office Action dated Sep. 27, 2017, in corresponding Korean Application No. 10-2016-0071101 (6 pages, in Korean).
Korean Office Action dated Sep. 27, 2017, in corresponding Korean Application No. 10-2016-0071102 (6 pages, in Korean).
Korean Office Action dated Sep. 27, 2017, in corresponding Korean Application No. 10-2016-0071103 (6 pages, in Korean).

* cited by examiner

FIG. 4
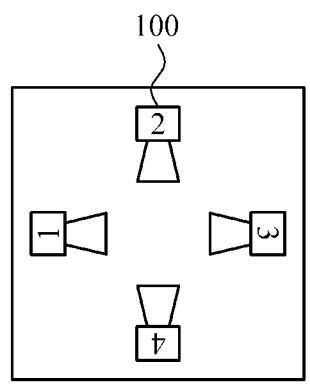
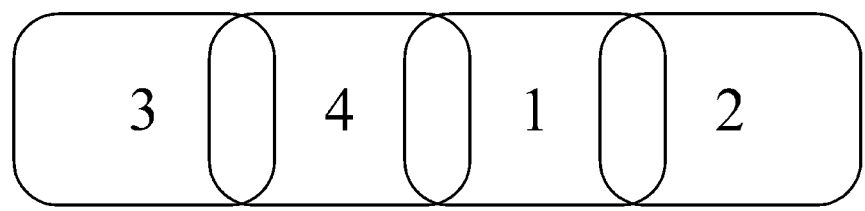

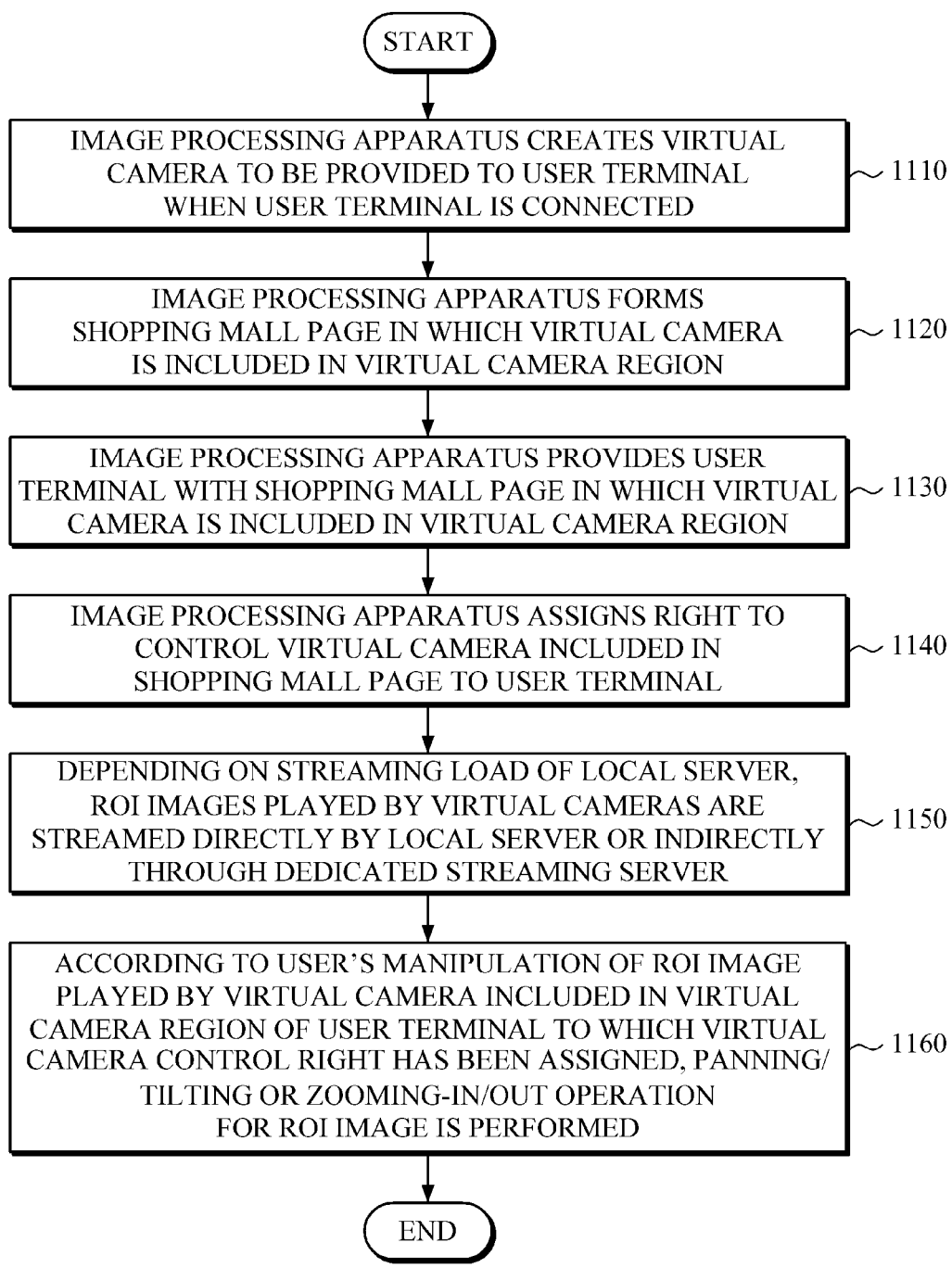

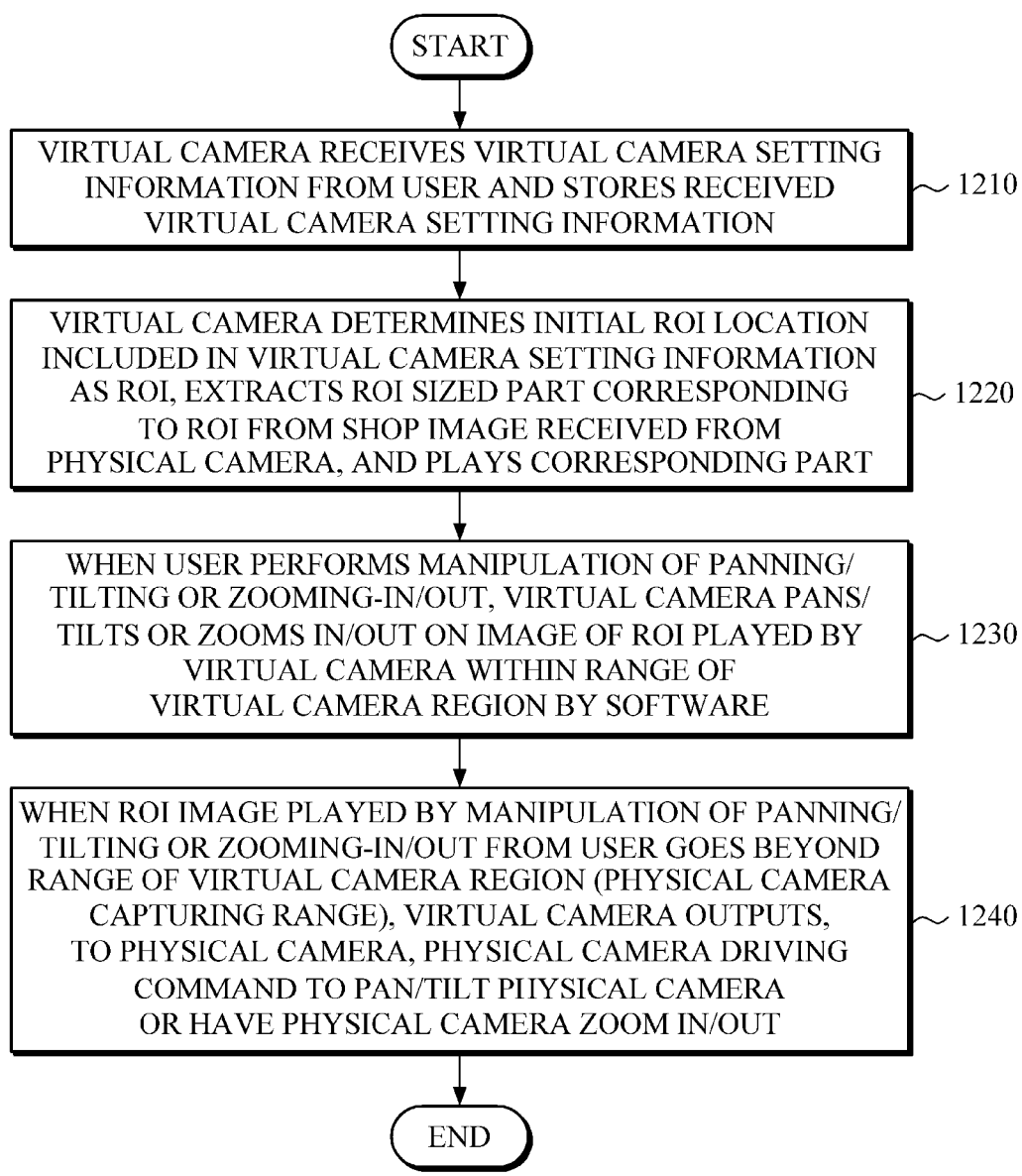

PERSONALIZED SHOPPING MALL SYSTEM USING VIRTUAL CAMERA

CROSS-REFERENCE TO RELATED APPLICATION

This application claims priority from Korean Patent Application Nos. 10-2015-0127917 filed on Sep. 9, 2015, 10-2015-0134902 filed on Sep. 23, 2015, 10-2015-0162825 filed on Nov. 19, 2015, 10-2016-0006535 filed on Jan. 19, 2016, 10-2016-0071099 filed on Jun. 8, 2016, 10-2016-0071101 filed on Jun. 8, 2016, in the Korean Intellectual Property Office, the disclosure of which is incorporated herein by reference in its entirety.

BACKGROUND

1. Field

The following description relates to a technology associated with an online shopping mall, and more particularly, to a personalized shopping mall system using a virtual camera.

2. Description of Related Art

Korean Patent Application Publication No. 10-2011-0072846, published on Jun. 29, 2011, has proposed a technology for cropping, from an image output from a camera, a part in which there is movement or a part to which attention is paid, such as a human face or a car license plate, and outputting the cropped part.

Korean Patent Application Publication No. 10-2013-0039652, published on Apr. 22, 2013, has proposed a load balancing technology for searching for two or more subnets storing content, selecting one subnet providing content requested according to a network state from among two or more found subnets, selecting a node providing the requested content, and delivering the content to a user. Thus, while a content server delivers content to the user, an optimal server node may be selected from a network to increase traffic efficiency and provide a high-quality, real-time streaming service.

The inventors of the present invention conducted research on a technology for creating a virtual camera having a different region of interest (ROI) from an image of an offline shop captured by one physical camera using the image cropping technology and streaming a shopping mall page including the virtual camera.

In addition, the inventors of the present invention conducted research on a technology for creating a virtual camera having a different ROI from an offline shop screen formed by sequentially connecting images of an offline shop captured by a plurality of physical cameras using the image cropping technology and streaming a shopping mall page including the virtual camera.

In addition, the inventors of the present invention conducted research on a technology for creating a plurality of different virtual cameras having regions in which 3D objects, which are detected using a stereo disparity between 2D images of the offline shop captured by a plurality of physical cameras disposed adjacent to each other and configured to capture shop images in real time, are located as ROIs from an offline shop screen including the 3D objects and streaming a shopping mall page including the virtual cameras.

In addition, the inventors of the present invention conducted research on a technology for creating a virtual camera having a different ROI from an image of an offline shop captured by a physical camera, providing a shopping mall page including the created virtual camera, and distributing and then transmitting steaming loads of ROI images that are played by virtual cameras, which are included in virtual camera regions of shopping mall pages.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to providing a personalized shopping mall system using a virtual camera that creates a virtual camera having a different ROI from an image of an offline shop captured by one physical camera and streaming a shopping mall page including the virtual camera.

The following description also relates to providing a personalized shopping mall system using a virtual camera that creates a virtual camera having a different ROI from an offline shop screen formed by sequentially connecting images of the offline shop captured by a plurality of physical cameras and streaming a shopping mall page including the virtual camera.

The following description also relates to providing a personalized shopping mall system using a virtual camera that creates a plurality of different virtual cameras having regions in which 3D objects, which are detected using a stereo disparity between 2D images of the offline shop captured by a plurality of physical cameras disposed adjacent to each other and configured to capture images of the shop in real time, are located as ROIs from an offline shop screen including the 3D objects and streaming a shopping mall page including the virtual cameras.

The following description also relates to providing a load distribution system for a personalized shopping mall page using a virtual camera that creates virtual cameras having different ROIs from an image of an offline shop captured by a physical camera, providing a shopping mall page including each of the virtual cameras, and distributing a steaming loads of ROI images that are played by the virtual cameras, which are included in virtual camera regions of shopping mall pages.

In one general aspect, a personalized shopping mall system using a virtual camera includes a physical camera configured to capture an image of an offline shop in real time; an image processing apparatus including an image receiving unit configured to receive the image of the offline shop captured by the physical camera and a virtual camera management unit configured to generate a plurality of virtual cameras having different regions of interest (ROIs) from the image of the offline shop received by the image receiving unit; and a virtual camera including an ROI selection unit configured to select an ROI from the image of the offline shop captured by the physical camera, an ROI playing unit configured to play an image of the ROI selected by the ROI selection unit, and an image processing unit configured to perform panning/tilting or zooming-in/out processing of the image of the ROI played by the ROI playing unit according to a manipulation of a user terminal.

The physical camera may be provided in plurality.

The camera management unit may form an integrated offline shop screen by sequentially connecting images of the offline shop captured by the plurality of physical cameras and may create a plurality of virtual cameras having different ROIs from the formed offline shop screen.

The virtual camera management unit may include a connection management unit configured to process connection and disconnection of the user terminal; a virtual camera creation unit configured to create a virtual camera to be provided to a user terminal that is allowed to be connected by the connection management unit; a shopping mall page creation unit configured to form a shopping mall page in which the virtual camera created by the virtual camera creation unit is included in a virtual camera region; a shopping mall page provision unit configured to provide the user terminal with the shopping mall page in which the virtual camera generated by the shopping mall page creation unit is included in the virtual camera region; and a control right assignment unit configured to assign a right to control the virtual camera included in the shopping mall page provided by the shopping mall page provision unit to the user terminal.

The right to control the virtual camera may be an authority to pan/tilt or zoom in/out on a virtual camera screen.

The shopping mall page created by the shopping mall page creation unit may include a product of interest (POI) region in which an image of the POI uploaded by a manager terminal is registered.

The shopping mall page created by the shopping mall page creation unit may include a video chatting region in which video chatting between a manager terminal and the user terminal is processed.

The shopping mall page created by the shopping mall page creation unit may include a shop information region in which offline shop information is provided.

The virtual camera may further include a simulative panning/tilting/zooming processing unit configured to output, to the image processing unit, a virtual camera control command to pan/tilt or zoom in/out on the ROI image played by the ROI playing unit in a range of the virtual camera region by software, according to a manipulation signal for panning/tilting or zooming-in/out.

The virtual camera may further include an optical panning/tilting/zooming processing unit configured to output, to the physical camera, a physical camera driving command to pan/tilt the physical camera or have the physical camera zoom in/out when the ROI image played by the ROI playing unit goes beyond the range of the virtual camera region.

The virtual camera may further include a setting information storage unit configured to store virtual camera setting information; and a virtual camera setting unit configured to receive the virtual camera setting information from a user.

The virtual camera setting unit may set at least one of an initial ROI location, an ROI size, resolution, quality, a compression format, and a virtual camera region pattern as the virtual camera setting information.

The image processing unit may include a memory configured to store the shop image captured by the physical camera; an ROI extraction unit configured to extract an ROI sized image of the ROI selected by the ROI selection unit from the shop image stored in the memory included in the camera setting information; an image scaler configured to convert the ROI image extracted by the ROI extraction unit into the resolution included in the camera setting information; and a codec configured to compress the ROI image converted by the image scaler in the compression format included in the camera setting information.

The image processing unit may further include a frame rate changing unit configured to change a frame rate to be suitable for the quality included in the camera setting information.

The image processing unit may extract a background object and a foreground object from the ROI image and perform processing such that an image of an ROI including only the background object, from which the foreground object has been removed, is played through the ROI playing unit.

The image processing unit may recognize a person from the ROI image and perform masking processing on the face of the recognized person.

ROIs selected by the ROI selection unit may overlap with one another.

The image processing apparatus may further include a multiplexing unit configured to convert the ROI images played by the plurality of virtual cameras into packet image signals originated from different ports having the same network address and multiplex the packet image signals into a single packet image stream; and an image transmission unit configured to transmit the single packet image stream obtained by the multiplexing through the multiplexing unit to user terminals through a single physical layer.

The virtual camera management unit may further include a control right reclaiming unit configured to reclaim the virtual camera control right assigned to the user terminal that is allowed to be disconnected by the connection management unit.

The plurality of physical cameras may be installed in a row.

The plurality of physical cameras may be installed in a radial pattern.

The virtual camera management unit may connect the images of the offline shops such that the images partially overlap with each other.

Other features and aspects will be apparent from the following detailed description, the drawings, and the claims.

BRIEF DESCRIPTION OF THE DRAWINGS

FIG. 4 is a view showing another example of a shop screen and an installation layout of physical cameras of the personalized shopping mall system using the virtual camera shown in FIG. 2.

FIG. 14 is a flowchart showing an example of a shopping mall page providing operation of the personalized shopping mall system using the virtual camera shown in FIG. 7.

FIG. 15 is a flowchart showing an example of a region of interest (ROI) extraction procedure performed by the virtual camera shown in FIG. 10.

Figure 1:
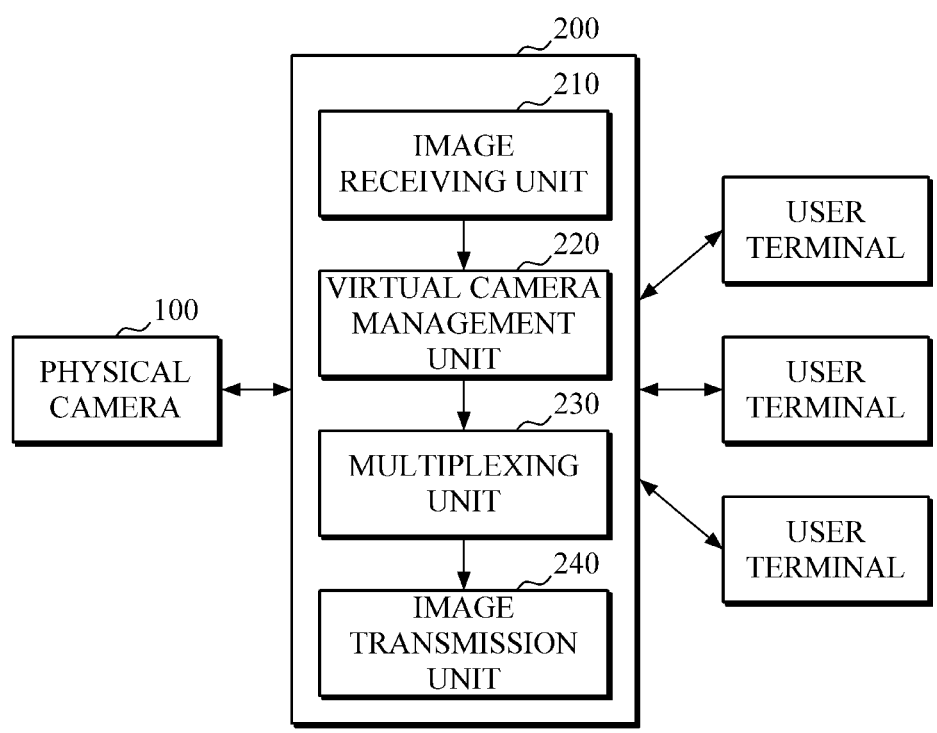
FIG. 1 is a block diagram showing a personalized shopping mall system using a virtual camera according to a first embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, the present invention will be described in detail to be easily understood and embodied by those skilled in the art through exemplary embodiments with reference to the accompany drawings.

In the following description, when the detailed description of the relevant known function or configuration is determined to unnecessarily obscure the important point of the present invention, the detailed description will be omitted.

Moreover, the terms used herein are defined in consideration of their functions in the exemplary embodiments of the present invention and thus may be changed depending on a user, the intent of an operator, or a custom. Accordingly, the terms should be defined based on the following overall description of this specification.

FIG. 1 is a block diagram showing a personalized shopping mall system using a virtual camera according to an embodiment of the present invention. As shown in FIG. 1, the personalized shopping mall system using the virtual camera according to this embodiment of the present invention includes one physical camera 100 and an image processing apparatus 200.

Figure 2:
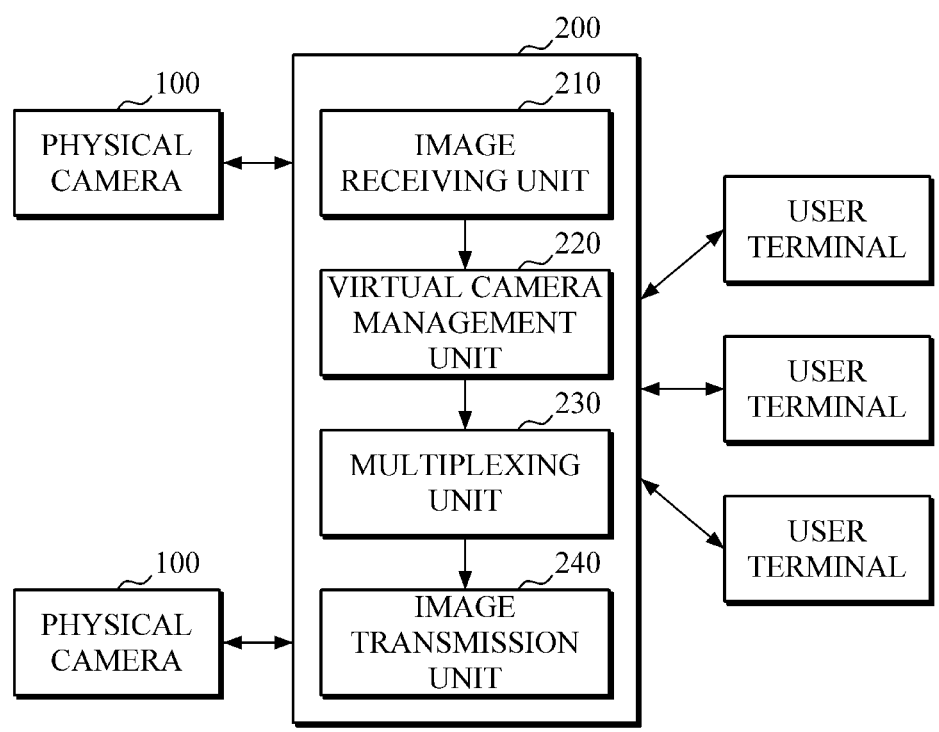
FIG. 2 is a block diagram showing a personalized shopping mall system using a virtual camera according to a second embodiment of the present invention.

FIG. 2 is a block diagram showing a personalized shopping mall system using a virtual camera according to a second embodiment of the present invention. As shown in FIG. 2, the personalized shopping mall system using the virtual camera according to this embodiment of the present invention includes a plurality of physical cameras 100 and an image processing apparatus 200.

Figure 3:
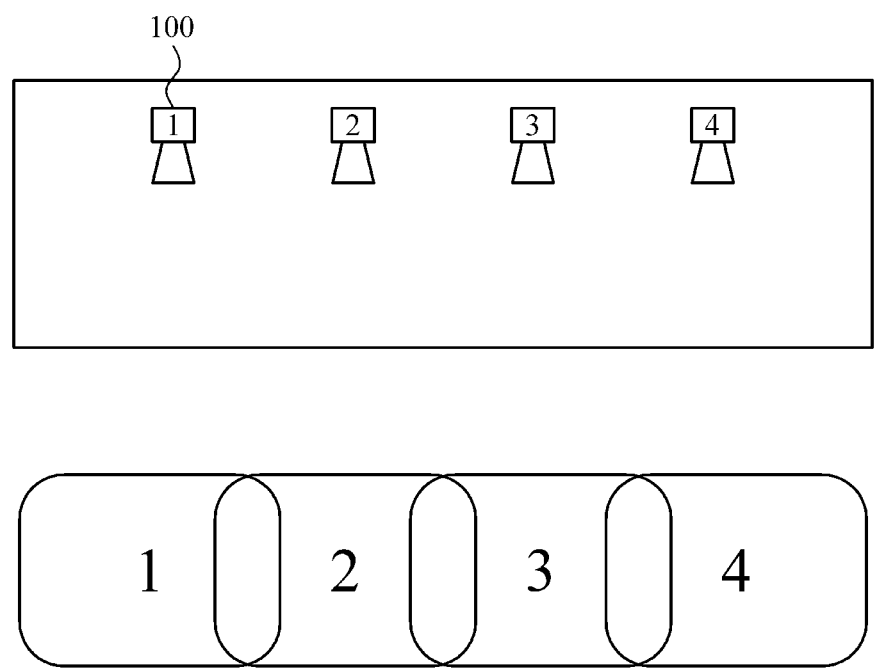
FIG. 3 is a view showing an example of a shop screen and an installation layout of physical cameras of the personalized shopping mall system using the virtual camera shown in FIG. 2.

FIG. 3 is a view showing an example of a shop screen and an installation layout of physical cameras of the personalized shopping mall using the virtual camera shown in FIG. 2. As shown in FIG. 3, the plurality of physical cameras 100 may be installed in a row.

FIG. 4 is a view showing another example of a shop screen and an installation layout of physical cameras of the personalized shopping mall using the virtual camera shown in FIG. 2. As shown in FIG. 4, the physical cameras 100 may be installed in a radial pattern.

Figure 5:
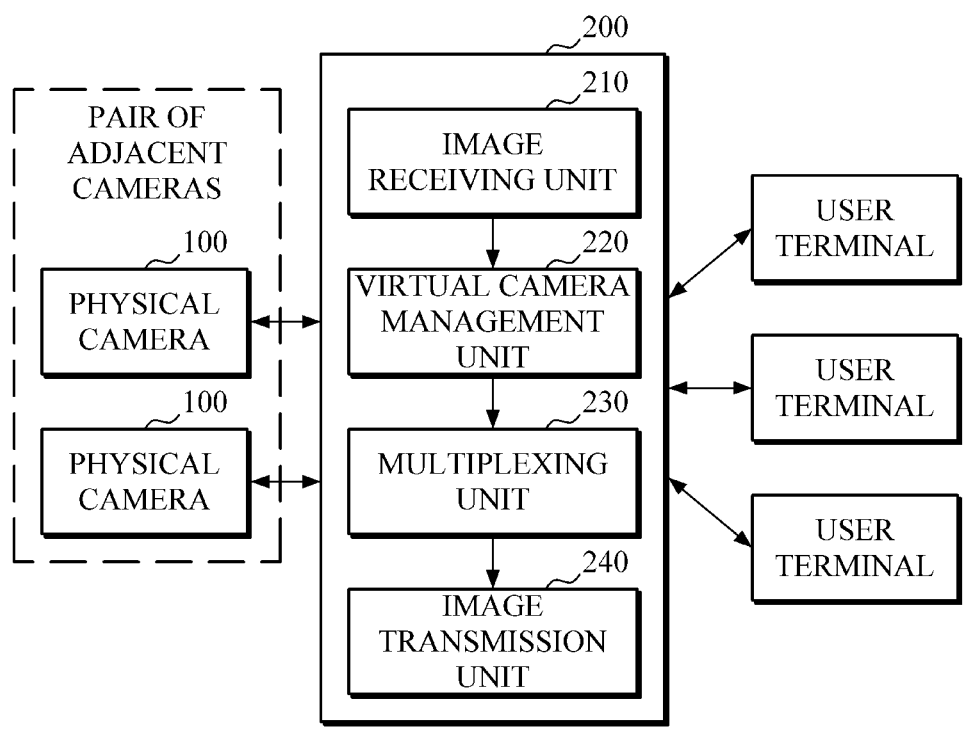
FIG. 5 is a block diagram showing a personalized shopping mall system using a virtual camera according to a third embodiment of the present invention.

FIG. 5 is a block diagram showing a personalized shopping mall system using a virtual camera according to a third embodiment of the present invention. As shown in FIG. 5, the personalized shopping mall system using the virtual camera according to this embodiment of the present invention includes a plurality of physical cameras 100, which are disposed adjacent to each other, and an image processing apparatus 200.

Figure 6:
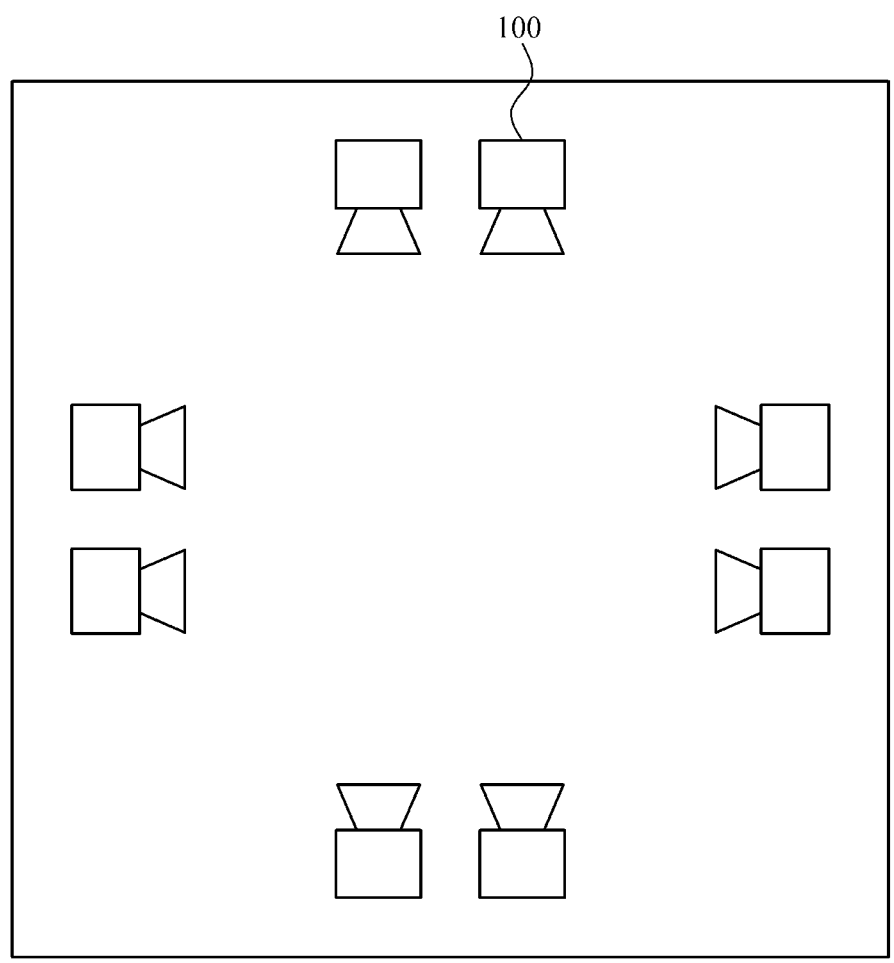
FIG. 6 is a view showing an example of an installation layout of physical cameras of the personalized shopping mall system using the virtual camera shown in FIG. 5.

FIG. 6 is a view showing an example of an installation layout of physical cameras of the personalized shopping mall using the virtual camera shown in FIG. 5. As shown in FIG. 6, the plurality of physical cameras 100 disposed adjacent to each other may be installed in four directions.

Figure 7:
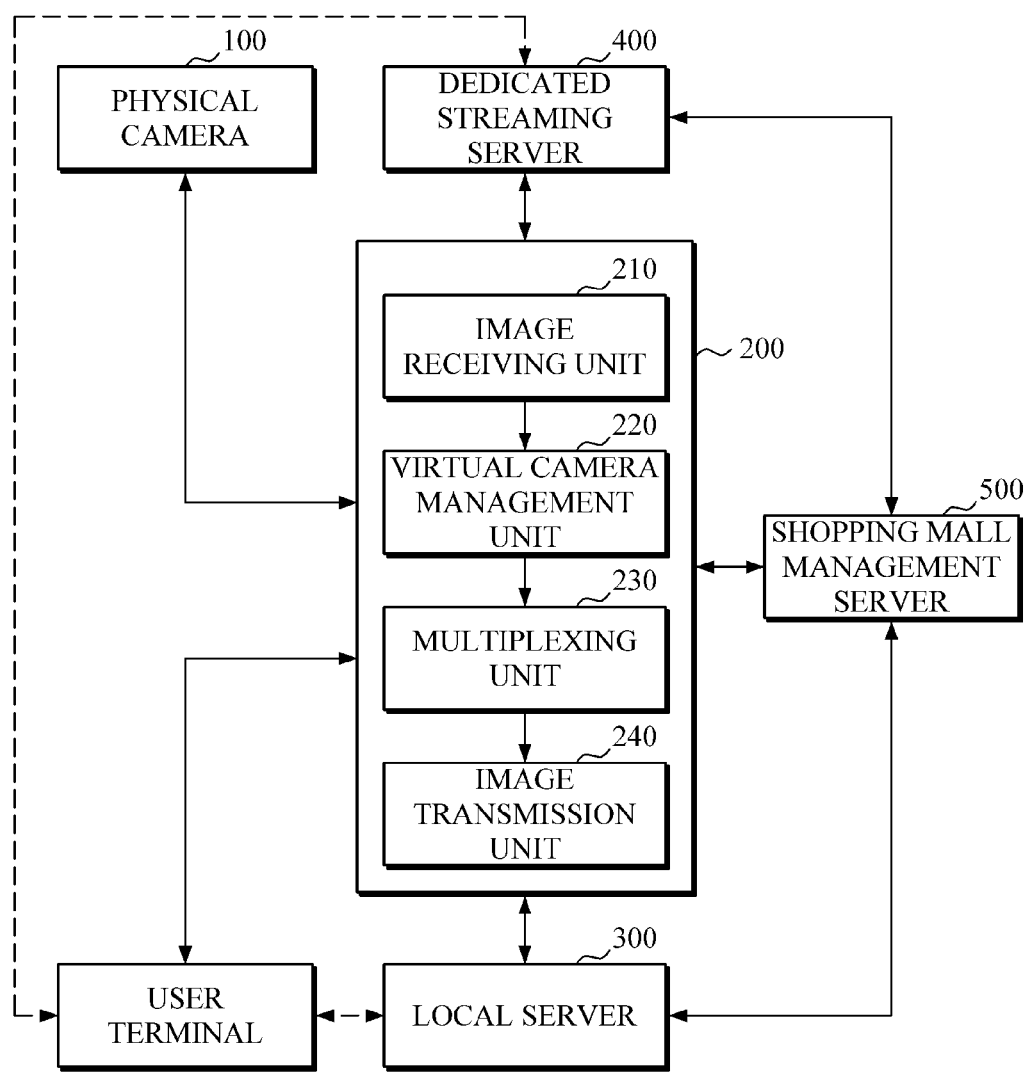
FIG. 7 is a block diagram showing a personalized shopping mall system using a virtual camera according to a fourth embodiment of the present invention.

FIG. 7 is a block diagram showing a personalized shopping mall system using a virtual camera according to a fourth embodiment of the present invention. As shown in FIG. 7, the personalized shopping mall system using the virtual camera according to this embodiment of the present invention includes a physical camera 100, an image processing apparatus 200, a local server 300, and a dedicated streaming server 400.

The camera 100 is installed in an offline shop and configured to capture an image of the offline shop in real time. For example, the camera 100 may include a general high-resolution camera, a panorama camera, a fisheye lens camera, etc.

The image processing apparatus 200 creates a plurality of virtual cameras having different regions of interest (ROIs) from the image of the offline shop captured by the physical camera 100, forms a plurality of shopping mall pages in which the plurality of virtual cameras are included in virtual camera regions, and provides the formed shopping mall pages to user terminals.

Here, the virtual cameras having different ROIs are software modules that crop images of different ROIs that are personalized for each user from the image of the offline shop and play the cropped images.

The local server 300 streams, to the user terminals, the ROI images played by the virtual cameras included in the virtual camera regions of the shopping mall pages that have been provided to the user terminals by the image processing apparatus 200.

When a streaming load of the local server 300 exceeds a threshold, the dedicated streaming server 400, instead of the local server 300, distributes the steaming load for the ROI images played by the virtual cameras included in the virtual camera regions of the shopping mall pages and performs the streaming.

Figure 8:
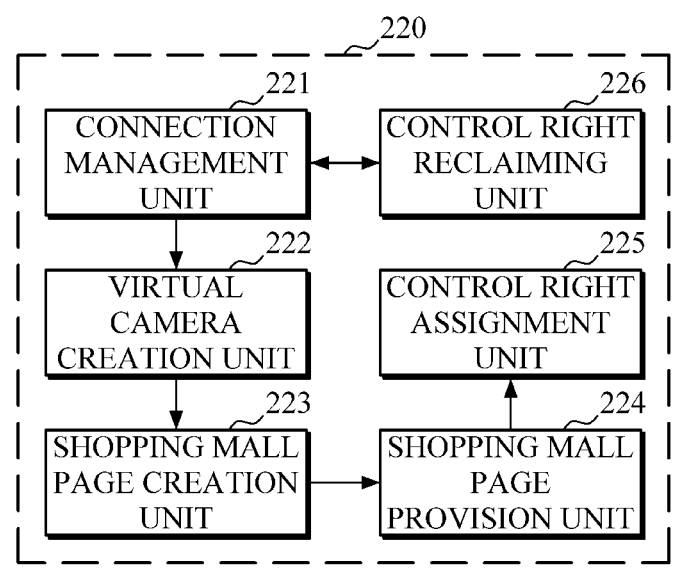
FIG. 8 is a block diagram showing a virtual camera management unit of an image processing apparatus of the personalized shopping mall system using the virtual camera according to an embodiment of the present invention.

FIG. 8 is a block diagram showing a virtual camera management unit of an image processing apparatus of the personalized shopping mall system using the virtual camera according to an embodiment of the present invention. The image processing apparatus 200 includes an image reception unit 210 and a virtual camera management unit 220.

First Embodiment

The image reception unit 210 receives an image of an offline shop captured by the physical camera 100.

The virtual camera management unit 220 creates a plurality of virtual cameras having different ROIs from the image of the offline shop received by the image reception unit 210.

The virtual camera management unit 220 includes a connection management unit 221, a virtual camera creation unit 222, a shopping mall page creation unit 223, a shopping mall page provision unit 224, and a control right assignment unit 225.

The connection management unit 221 processes connection and disconnection of a user terminal. For example, the connection management unit 221 may search a member registration DB (not shown) for a user ID and a password that are entered from the user terminal that has requested the connection to the image processing apparatus 200 to process the connection of the user terminal.

According to a disconnection request from the user terminal that has been connected to the image processing apparatus 200, the connection management unit 221 may process the disconnection of the user terminal. Here, the user terminal may be a personal computer (PC) or a mobile terminal such as a smartphone.

The virtual camera creation unit 222 creates a virtual camera to be provided to a user terminal that is allowed to be connected by the connection management unit 221. For example, the virtual camera creation unit 222 may create a plurality of virtual cameras having different ROIs from the received image of the offline shops.

Here, the virtual cameras are software modules that crop, from the image of the offline shop, images of specific ROIs in which a user has an interest and play the cropped images, which will be described in detail later.

The shopping mall page creation unit 223 forms a shopping mall page in which a virtual camera created by the virtual camera creation unit 222 is included in a virtual camera region. Here, the shopping mall page may further include a product of interest (POI) region in which an image of a POI uploaded by a manager terminal (not shown) is registered, a video chatting region in which video chatting between the manager terminal and the user terminal is processed, a shop information region in which offline shop information is provided, etc.

The shopping mall page provision unit 224 provides the user terminal with the shopping mall page created by the shopping mall page creation unit 223 in which the virtual camera is included in the virtual camera region.

When the shopping mall page is provided to the user terminal, the virtual camera included in the virtual camera region of the shopping mall page streams an ROI image of an actual offline shop in real time.

The user feels as if he or she is actually visiting and shopping at the offline shop, while watching online the ROI image of the offline shop streamed by the virtual camera in real time.

The control right assignment unit 225 assigns, to the user terminal, a right to control the virtual camera included in the shopping mall page provided by the shopping mall page provision unit 224.

Here, the virtual camera control right may be an authority to pan/tilt or zoom in/out on a virtual camera screen. The panning/tilting of or zooming in/out on the virtual camera screen is not a physical operation control but a software processing such as up, down, left, or right movement or enlargement/reduction of the screen.

For example, when a finger is touched and moved up, down, left, or right on a touch screen of a user terminal to which the control right has been assigned, an event of panning/tilting a virtual camera screen may occur, thus moving the ROI. Thus, an image of another region of the offline shop may be streamed and played by the virtual camera.

As another example, when two fingers are moved toward or away from each other on the touch screen of the user terminal to which the control right has been assigned, zooming in/out on a virtual camera screen occurs, and thus the ROI may be enlarged or reduced.

Each user performs an independent control on a virtual camera included in a shopping mall page provided to his or her own user terminal and receives an image of an ROI in which he or she has an interest. Thus, a personalized ROI image that is different for each user is played for each user terminal.

Using such an implementation can make a user feel as if he or she is actually visiting and shopping at the offline shop by creating a virtual camera having a different ROI from the image of the offline shop captured by the physical camera and streaming a shopping mall page including the virtual camera.

Second Embodiment

The image reception unit 210 receives images of an offline shop captured by the plurality of physical cameras 100.

The virtual camera management unit 220 forms an integrated offline shop screen by sequentially connecting the images of the offline shop received by the image reception unit 210 and creates a plurality of virtual cameras having different ROIs from the formed offline shop screen.

In this case, the virtual camera management unit 220 may connect the images of the offline shop to form the offline shop screen such that the images partially overlap with each other. When the connection is made such that the images of the offline shop partially overlap with each other, a missing region can be prevented.

The virtual camera management unit 220 includes a connection management unit 221, a virtual camera creation unit 222, a shopping mall page creation unit 223, a shopping mall page provision unit 224, and a control right assignment unit 225.

The connection management unit 221 processes connection and disconnection of a user terminal. For example, the connection management unit 221 may search a member registration DB (not shown) for a user ID and a password that are entered from the user terminal that has requested connecting to the image processing apparatus 200 to process the connection of the user terminal.

According to a disconnection request from the user terminal that has been connected to the image processing apparatus 200, the connection management unit 221 may process the disconnection of the user terminal. Here, the user terminal may be a PC or a mobile terminal such as a smartphone.

The virtual camera creation unit 222 creates a virtual camera to be provided to a user terminal that is allowed to be connected by the connection management unit 221. For example, the virtual camera creation unit 222 may form an integrated offline shop screen by sequentially connecting the received images of the offline shop and may create a plurality of virtual cameras having different ROIs from the formed offline shop screen.

Here, the virtual cameras are software modules that crop, from the image of the offline shop, images of specific ROIs in which a user has an interest and play the cropped images, which will be described in detail later.

The shopping mall page creation unit 223 forms a shopping mall page in which a virtual camera created by the virtual camera creation unit 222 is included in a virtual camera region. Here, the shopping mall page may further include a product of interest (POI) region in which an image of a POI uploaded by a manager terminal (not shown) is registered, a video chatting region in which video chatting between the manager terminal and the user terminal is processed, a shop information region in which offline shop information is provided, etc.

The shopping mall page provision unit 224 provides the user terminal with the shopping mall page created by the shopping mall page creation unit 223 in which the virtual camera is included in the virtual camera region.

When the shopping mall page is provided to the user terminal, the virtual camera included in the virtual camera region of the shopping mall page streams an ROI image of an actual offline shop in real time.

The user feels as if he or she is actually visiting and shopping at the offline shop, while watching online the ROI image of the offline shop streamed by the virtual camera in real time.

The control right assignment unit 225 assigns, to the user terminal, a right to control the virtual camera included in the shopping mall page provided by the shopping mall page provision unit 224.

Here, the virtual camera control right may be an authority to pan/tilt or zoom in/out on a virtual camera screen. The panning/tilting of or zooming in/out on the virtual camera screen is not a physical operation control but a software processing of up, down, left, or right movement or enlargement/reduction of the screen.

For example, when a finger is touched and moved up, down, left, or right on a touch screen of a user terminal to which the control right has been assigned, an event of panning/tilting a virtual camera screen may occur, thus moving the ROI. Thus, an image of another region of the offline shop may be streamed and played by the virtual camera.

As another example, when two fingers are moved toward or away from each other on the touch screen of the user terminal to which the control right has been assigned, zooming in/out on a virtual camera screen may occur, thus enlarging or reducing the ROI.

Each user performs an independent control on a virtual camera included in a shopping mall page provided to his or her own user terminal and receives an image of an ROI in which he or she has an interest. Thus, a personalized ROI image that is different for each user is played for each user terminal.

Using such an implementation can make a user feel as if he or she is actually visiting and shopping at the offline shop by creating a virtual camera having a different ROI from the image of the offline shop captured by the physical camera and streaming a shopping mall page including the virtual camera.

Third Embodiment

The image reception unit 210 receives two-dimensional (2D) images of an offline shop captured by a plurality of physical cameras 100 that are disposed adjacent to each other.

The virtual camera management unit 220 detects 3D objects using a stereo disparity between 2D images of the offline shop received by the image reception unit 210, forms an offline shop screen including the detected 3D objects, and creates, from the formed offline shop screen, a plurality of different virtual cameras having regions in which the 3D objects are located as ROIs.

In this case, the offline shop screen formed by the virtual camera management unit 220 may be an offline shop screen formed by combining images captured in real time by a plurality of physical cameras 100 installed in one direction among the plurality of physical cameras 100 installed in four directions.

A stereo vision technique for detecting a 3D object using a stereo disparity, which is a 3D image processing technique using the principle of creating a stereo effect due to a human visual system receiving different images due to the location difference between the left and right eyes and the brain recognizing a three-dimensional shape from the different images to feel a sense of distance, is a technology that is well-known before the filing of this patent application. Thus, a detailed description thereof will be omitted.

The virtual camera management unit 220 includes a connection management unit 221, a virtual camera creation unit 222, a shopping mall page creation unit 223, a shopping mall page provision unit 224, and a control right assignment unit 225.

The connection management unit 221 processes connection and disconnection of a user terminal. For example, the connection management unit 221 may search a member registration DB (not shown) for a user ID and a password that are entered from the user terminal that has requested connecting to the image processing apparatus 200 to process the connection of the user terminal.

According to a disconnection request from the user terminal that has been connected to the image processing apparatus 200, the connection management unit 221 may process the disconnection of the user terminal. Here, the user terminal may be a PC or a mobile terminal such as a smartphone.

The virtual camera creation unit 222 creates a virtual camera to be provided to a user terminal that is allowed to be connected by the connection management unit 221. For example, the virtual camera creation unit 222 may detect 3D objects using a stereo disparity between the received 2D images of the offline shop, form an offline shop screen including the detected 3D objects, and create, from the formed offline shop screen, a plurality of different virtual cameras having regions in which the 3D objects are located as ROIs.

Here, the virtual cameras are software modules that crop, from the offline shop screen, images of personalized ROIs in which different 3D objects are located and play the cropped images, which will be described in detail later.

The shopping mall page creation unit 223 forms a shopping mall page in which a virtual camera created by the virtual camera creation unit 222 is included in a virtual camera region. Here, the shopping mall page may further include a product of interest (POI) region in which an image of a POI uploaded by a manager terminal (not shown) is registered, a video chatting region in which video chatting between the manager terminal and the user terminal is processed, a shop information region in which offline shop information is provided, etc.

The shopping mall page provision unit 224 provides the user terminal with the shopping mall page created by the shopping mall page creation unit 223 in which the virtual camera is included in virtual camera region.

When the shopping mall page is provided to the user terminal, the virtual camera included in the virtual camera region of the shopping mall page streams an ROI image of an actual offline shop in real time. In this case, the 3D objects detected by the stereo disparity are rendered and displayed in the virtual camera region.

The user feels as if he or she is actually visiting and shopping at the offline shop while watching online the 3D objects located in the ROI image of the offline shop streamed by the virtual camera in real time.

The control right assignment unit 225 assigns, to the user terminal, a right to control the virtual camera included in the shopping mall page provided by the shopping mall page provision unit 224.

Here, the virtual camera control right may be an authority to rotate, zoom in/out on, or pann/tilt the 3D objects that are rendered and displayed. The rotating of, zooming in/out on, or panning/tilting of the 3D objects that are rendered and displayed on the virtual camera screen is not a physical operation control but a software processing of rotation, enlargement/reduction or up, down, left, or right movement of the screen.

For example, when a finger is touched and moved up, down, left, or right on a touch screen of a user terminal to which the control right has been assigned, an event of rotating a 3D object may occur, thus rotating the 3D object rendered and displayed on the virtual camera screen in a corresponding direction.

As another example, when two fingers are moved toward or away from each other on the touch screen of the user terminal to which the control right has been assigned, zooming in/out on a 3D object may occur, thus enlarging or reducing the 3D object rendered and displayed on the virtual camera screen.

Each user performs an independent control on a virtual camera included in a shopping mall page provided to his or her own user terminal and receives an image of a region including a 3D object in which he or she has an interest. Thus, a personalized ROI image that is different for each user is played for each user terminal.

Using such an implementation can make a user feel as if he or she is actually visiting and shopping at the offline shop by creating a plurality of different virtual cameras having regions in which 3D objects, which are detected using a stereo disparity between 2D images of the offline shop captured by a plurality of physical cameras disposed adjacent to each other and configured to capture shop images in real time, are located as ROIs from an offline shop screen including the 3D objects and streaming a shopping mall page including the virtual cameras.

Here, each user can perform control to rotate, zoom in/out on, or pan/tilt the 3D objects that are rendered and displayed through a virtual camera, thus overcoming a limitation of an image that can only be controlled by one person, for an image that is streamed using a single camera.

Fourth Embodiment

The image reception unit 210 receives an image of an offline shop captured by the physical camera 100.

The virtual camera management unit 220 creates a plurality of virtual cameras having different ROIs from the image of the offline shop received by the image reception unit 210.

The virtual camera management unit 220 includes a connection management unit 221, a virtual camera creation unit 222, a shopping mall page creation unit 223, a shopping mall page provision unit 224, and a control right assignment unit 225.

The connection management unit 221 processes connection and disconnection of a user terminal. For example, the connection management unit 221 may search a member registration DB (not shown) for a user ID and a password that are entered from the user terminal that has requested connecting to the image processing apparatus 200 to process the connection of the user terminal.

According to a disconnection request from the user terminal that has been connected to the image processing apparatus 200, the connection management unit 221 may process the disconnection of the user terminal. Here, the user terminal may be a PC or a mobile terminal such as a smartphone.

The virtual camera creation unit 222 creates a virtual camera to be provided to a user terminal that is allowed to be connected by the connection management unit 221. For example, the virtual camera creation unit 222 may create a plurality of virtual cameras having different ROIs from the received image of the offline shops.

Here, the virtual cameras are software modules that crop, from the image of the offline shop, images of specific ROIs in which a user has an interest and play the cropped images, which will be described in detail later.

The shopping mall page creation unit 223 forms a shopping mall page in which a virtual camera created by the virtual camera creation unit 222 is included in a virtual camera region. Here, the shopping mall page may further include a product of interest (POI) region in which an image of a POI uploaded by a manager terminal (not shown) is registered, a video chatting region in which video chatting between the manager terminal and the user terminal is processed, a shop information region in which offline shop information is provided, etc.

The shopping mall page provision unit 224 provides the user terminal with the shopping mall page created by the shopping mall page creation unit 223 in which the virtual camera is included in virtual camera region.

When the shopping mall page is provided to the user terminal, the virtual camera included in the virtual camera region of the shopping mall page streams an ROI image of an actual offline shop in real time.

The user feels as if he or she is actually visiting and shopping at the offline shop, while watching online the ROI image of the offline shop streamed by the virtual camera in real time.

The control right assignment unit 225 assigns, to the user terminal, a right to control the virtual camera included in the shopping mall page provided by the shopping mall page provision unit 224.

Here, the virtual camera control right may be an authority to pan/tilt or zoom in/out on a virtual camera screen. The panning/tilting of or zooming in/out on a virtual camera screen is not a physical operation control but a software processing of up, down, left, or right movement or enlargement/reduction of the screen.

For example, when a finger is touched and moved up, down, left, or right on a touch screen of a user terminal to which the control right has been assigned, an event of panning/tilting a virtual camera screen may occur, thus moving the ROI. Thus, an image of another region of the offline shop may be streamed and played by the virtual camera.

As another example, when two fingers are moved toward or away from each other on the touch screen of the user terminal to which the control right has been assigned, zooming in/out on a virtual camera screen may occur, thus enlarging or reducing the ROI.

Each user performs an independent control on a virtual camera included in a shopping mall page provided to his or her own user terminal and receives an image of an ROI in which he or she has an interest. Thus, a personalized ROI image that is different for each user is played for each user terminal.

The local server 300 streams, to the user terminals, the ROI images played by the virtual cameras included in the virtual camera regions of the shopping mall pages that have been provided to the user terminals by the image processing apparatus 200.

When a streaming load of the local server 300 exceeds a threshold, the dedicated streaming server 400, instead of the local server 300, distributes the steaming load for the ROI images replayed by the virtual cameras included in the virtual camera regions of the shopping mall pages and performs the streaming.

That is, when a shopping mall page is provided to a user terminal by the image processing apparatus 200, an ROI image of an actual offline shop captured by a virtual camera included in a virtual camera region of the shopping mall page is streamed by the local server 300 or the dedicated streaming server 400 in real time.

In this case, depending on the streaming load of the local server 300, the ROI images played by the virtual cameras are streamed directly by the local server 300 or indirectly through the dedicated streaming server 400.

The personalized shopping mall system using a virtual camera according to this embodiment of the present invention may further include a shopping mall management server 500. The shopping mall management server 500 monitors the streaming load of the local server 300 to determine whether the streaming load of the local server 300 exceeds a threshold. When it is determined that the streaming load of the local server 300 exceeds the threshold, the shopping mall management server reclaims the streaming control right from the local server 300 and transfers the streaming control right to the dedicated streaming server 400.

For example, the determination of whether the streaming load of the local server exceeds the threshold may be performed by detecting a processable sessions per second (SPS), a processable packets per second (PPS), a processable transactions per second (TPS), etc.

When the streaming control right is transferred to the dedicated streaming server 400 and also the streaming load of the local server 300 drops below the threshold, the shopping mall management server 500 reclaims the streaming control right from the dedicated streaming server 400 and returns the streaming control right to the local server 300.

Through such an implementation, the user feels as if he or she is actually visiting and shopping at the offline shop, while watching online the ROI image of the offline shop streamed by the virtual camera in real time.

In addition, the shopping mall page may be provided at high speed by distributing the streaming load for the ROI images played by the virtual cameras included in the virtual camera regions of the shopping pages and streaming.

Figure 9:
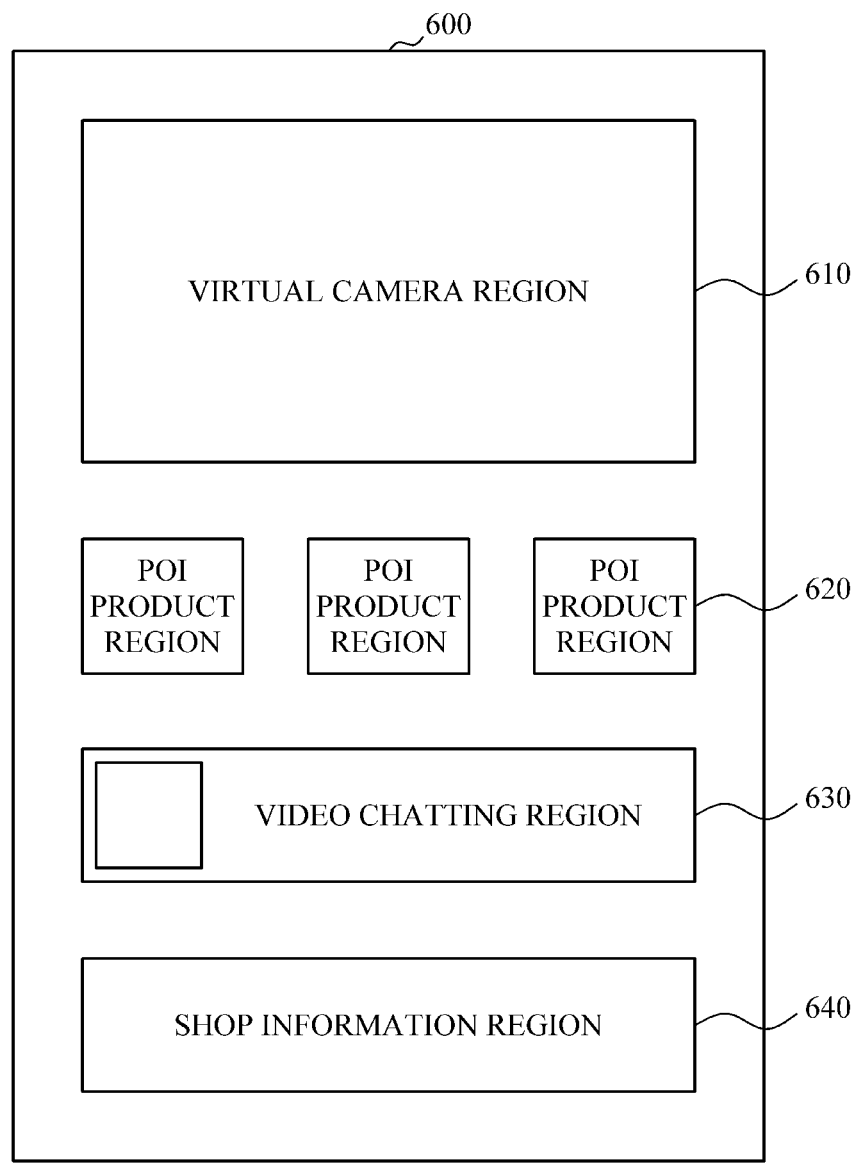
FIG. 9 is a block diagram showing an example of a shopping mall page created by the image processing apparatus of the personalized shopping mall system using the virtual camera according to an embodiment of the present invention.

The shopping mall pages created according to the first to fourth embodiments will be described with reference to FIG. 9. FIG. 9 is a block diagram showing an example of a shopping mall page created by the image processing apparatus of the personalized shopping mall system using the virtual camera according to an embodiment of the present invention. It can be seen that a virtual camera region 610, a product of interest (POI) region 620, a video chatting region 630, and a shop information region 640 are included in a shopping mall page 600.

According to an additional aspect of the present invention, the image processing apparatus 200 may further include a multiplexing unit 230 and image transmitting unit 240.

The multiplexing unit 230 converts ROI images played by the plurality of virtual cameras into packet image signals originated from different ports having the same network address and multiplexes the packet image signals into a single packet image stream.

The image transmission unit 240 transmits the single packet image stream obtained by multiplexing through the multiplexing unit 230 to user terminals through a single physical layer.

For example, ROI image signals output by the plurality of virtual cameras may be packet signals having distinct network addresses. In this case, in order to perform the multiplexing, the multiplexing unit 230 allocates different port numbers to the ROI image signals output by the plurality of virtual cameras while converting the network addresses of the ROI image signals into the same network address using a network address translation (NAT) function.

For example, the ROI image signals output by the plurality of virtual camera may be image stream data. In this case, in order to perform the multiplexing, the multiplexing unit 230 may convert the ROI image signals output by the plurality of virtual cameras into packets having the same network address and different port numbers.

For example, '160,245,200,1:8091' may be allocated to an address of an ROI image signal output by one virtual camera, and '160,245,200,1:8092' may be allocated to an address of an RIO image signal output by another virtual camera. The multiplexed image packets having the same IP address may be output through the image transmission unit 240, which is a single physical layer PHY.

According to an additional aspect of the present invention, the virtual camera management unit 220 may further include a control right reclaiming unit 226. The control right reclaiming unit 226 reclaims a virtual camera control right assigned to a user terminal that is allowed to be disconnected by the connection management unit 221.

That is, in this embodiment, when a user terminal to which a virtual camera control right has been assigned by the control right assignment unit 225 is disconnected, the control right reclaiming unit 226 reclaims the virtual camera control right that has been assigned to the user terminal.

Through such an implementation, the present invention can make a user feel as if he or she is actually visiting and shopping at the offline shop by creating a virtual camera having a different ROI from the image of the offline shop captured by the physical camera and streaming a shopping mall page including the virtual camera.

At this point, since each user can control a panning/tilting control for a virtual camera, individual ROIs of the users may overlap with one another, thus overcoming a limitation of panning/tilting that can be controlled by only one person for an image that is streamed using a single camera.

Figure 10:
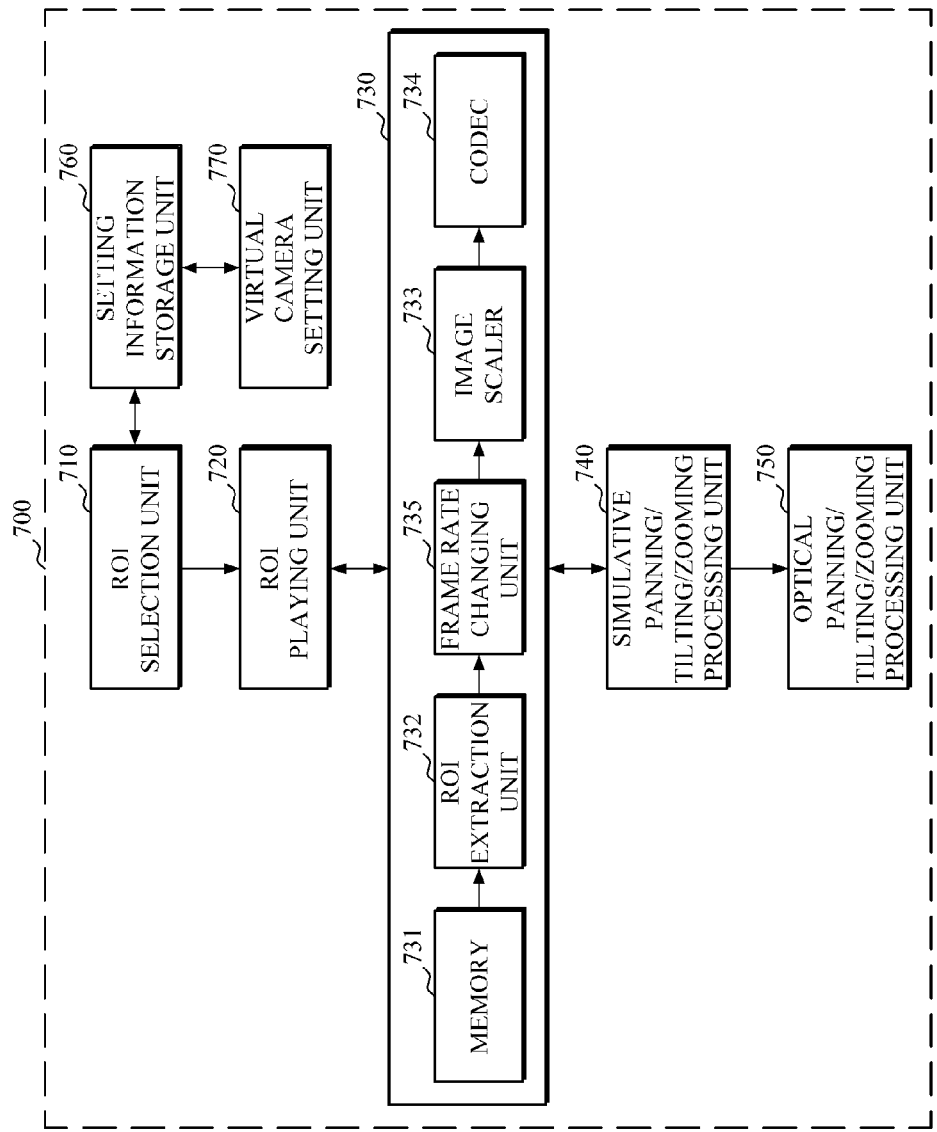
FIG. 10 is a block diagram showing a virtual camera of the personalized shopping mall system using the virtual camera according to an embodiment of the present invention.

FIG. 10 is a block diagram showing a virtual camera of the personalized shopping mall system using the virtual camera according to an embodiment of the present invention. As shown in FIG. 10, a virtual camera 700 included in a virtual camera region of a shopping mall page includes an ROI selection unit 710, an ROI playing unit 720, and an image processing unit 730.

For the first, second, and fourth embodiments, the ROI selection unit 710 selects an ROI from among images of an offline shop captured by the physical camera 100. For example, when a region in which popular products of the offline shop are displayed is stored as an initial ROI location, the ROI selection unit 710 may select a region corresponding to the initial ROI location as an ROI.

For the third embodiment, the ROI selection unit 710 selects a region in which a specific 3D object is located as an ROI from an offline shop screen. For example, the ROI selection unit 710 may select a region in which a specific 3D object is located as an ROI through a user selection for 3D objects detected using a stereo disparity between 2D images of the offline shop captured by a plurality of physical cameras 100 positioned adjacent to each other.

For the first, second, and fourth embodiments, the ROI playing unit 720 plays an image of the ROI selected by the ROI selection unit 710. Thus, a user feels as if he or she is actually visiting and shopping at the offline shop and enjoys online shopping while watching online the ROI image of the offline shop streamed by the virtual camera in real time.

For the third embodiment, the ROI playing unit 720 renders and displays a 3D object of the ROI selected by the ROI selection unit 710. Thus, a user feels as if he or she is actually visiting and shopping at the offline shop and enjoys online shopping while watching online a 3D object of the ROI rendered and displayed by the virtual camera in real time.

For the first, second, and fourth embodiments, according to a manipulation through a user terminal, the image processing unit 730 processes panning/tilting of or zooming-in/out of the image of ROI played by the ROI playing unit 720.

For the third embodiment, according to a manipulation through a user terminal, the image processing unit 730 processes rotating of, zooming-in/out on, or panning/tilting of the 3D object rendered and displayed by the ROI playing unit 720.

When there are a plurality of 3D objects that overlap in the ROI, the ROI playing unit 720 may display a specific 3D object selected from among the plurality of 3D objects. That is, when there is another 3D object overlapping with a 3D object of interest to be rendered and displayed as a foreground object or a background object, the ROI playing unit 720 may select only the 3D object of interest to be rendered and displayed and display the selected 3D object. Thus, the 3D object of interest to be rendered and displayed may be selected by the ROI selection unit 710.

For the first, second, and fourth embodiments, the ROI image selected by the ROI selection unit 710 and played by the ROI playing unit 720 is changed by a manipulation of panning/tilting of or zooming in/out on a virtual camera screen through a user terminal to which the virtual camera control right has been assigned.

According to the manipulation of panning/tilting of or zooming in/out on a virtual camera screen through the user terminal, the image processing unit 730 processes panning/tilting of or zooming in/out on the ROI image.

For the third embodiment, the ROI image selected by the ROI selection unit 710 and played by the ROI playing unit 720 is changed by a manipulation of rotating of, zooming-in/out on, or panning/tilting of the 3D object through the user terminal to which the virtual camera control right has been assigned.

According to the manipulation of rotating of, zooming-in/out on, or panning/tilting of the 3D object through the user terminal, the image processing unit 730 performs rotating of, zooming in/out on, or panning/tilting of an 3D object included in the ROI image.

According to an additional aspect of the present invention, the virtual camera 700 may further include a simulative panning/tilting/zooming processing unit 740. According to a panning/tilting or zooming-in/out manipulation signal, the simulative panning/tilting/zooming processing unit 740 outputs, to the image processing unit 730, a virtual camera control command to, by software, pan/tilt or zoom in/out on the ROI image played by the ROI playing unit 720 within the range of the virtual camera region.

When the user performs the panning/tilting or zooming-in/out manipulation through the user terminal, the simulative panning/tilting/zooming processing unit 740 outputs, to the image processing unit 730, a virtual camera control command to pan/tilt or zoom in/out on the ROI image played by the ROI playing unit 720 in response to the user manipulation, and the image processing unit 730, by software, pans/tilts or zooms in/out on the ROI image within the range of the virtual camera region to change the ROI.

According to an additional aspect of the present invention, the virtual camera 700 may further include an optical panning/tilting/zooming processing unit 750. When the ROI image played by the ROI playing unit 720 goes beyond the range of the virtual camera region, the optical panning/tilting/zooming processing unit 750 outputs, to the physical camera 100, a physical camera driving command to pan/tilt the physical camera 100 or have the physical camera 100 zoom in/out.

There is a limitation to controlling panning/tilting the virtual camera or having the virtual camera zoom in/out by software through the simulative panning/tilting/zooming processing unit 740. When the ROI image goes beyond the range of the virtual camera region, it becomes impossible to control the panning/tilting the virtual camera or having the virtual camera zoom-in/out by software, and the physical camera 100 should then be directly controlled to pan/tilt or to zoom in/out through the optical panning/tilting/zooming processing unit 750.

When the ROI image goes beyond the range of the virtual camera region by the panning/tilting or zooming-in/out manipulation through the user terminal, the optical panning/tilting/zooming processing unit 750 outputs, to the physical camera 100, a physical camera driving command to pan/tilt the physical camera 100 or have the physical camera 100 zoom in/out, and the physical camera 100 may pan/tilt or zoom in/out on the ROI image that is beyond the range of the virtual camera region to change the ROI.

According to an additional aspect of the present invention, the virtual camera 700 may further include a setting information storage unit 760 and a virtual camera setting unit 770.

The setting information storage unit 760 stores virtual camera setting information. For example, the virtual camera setting information may include at least one of an initial ROI location, an ROI size, resolution, quality, a compression format, and a virtual camera region pattern.

The virtual camera setting unit 770 receives the virtual camera setting information from the user and stores the virtual camera setting information in the setting information storage unit 760. For example, the virtual camera setting unit 770 may set at least one of an initial ROI location, an ROI size, resolution, quality, a compression format, and a virtual camera region pattern as the virtual camera setting information.

According to an additional aspect of the present invention, the image processing unit 730 may include a memory 731, an ROI extraction unit 732, an image scaler 733, and a codec 734.

The memory 731 stores a shop image captured by a physical camera. For example, the memory 731 may be a semiconductor memory that buffers the shop image captured by the physical camera 100 and stores the shop image by frame. In this case, the size of the shop image stored in the memory 731 may be less than or equal to the size of the shop image captured by the physical camera.

The ROI extraction unit 732 extracts an image of the ROI selected by the ROI selection unit 710 from the shop image stored in the memory 731 according to the ROI size included in the camera setting information.

For example, the ROI extraction unit 732 may extract an ROI image having the ROI size from shop image frames buffered and stored in the memory in real time. Here, the ROI size may be less than the size of the shop images buffered and stored in the memory 731.

The image scaler 733 converts an image of the ROI extracted by the ROI extraction unit 732 into the resolution included in the camera setting information. For example, when the resolution included in the camera setting information is 640*480, the image scaler 733 may convert the ROI image into the resolution of 640*480.

The codec 734 compresses the ROI image converted by the image scaler 733 in the compression format included in the camera setting information. For example, the codec 734 may compress an ROI image in a specific format such as Moving Picture Expert Group (MPEG)-2 and output the compressed ROI image.

According to an additional aspect of the present invention, the image processing unit 730 may further include a frame rate changing unit 735. The frame rate changing unit 735 changes a frame rate of the ROI image to be suitable for the quality included in the camera setting information. Here, the quality included in the camera setting information may be set in multiple levels, e.g., to be high, medium, or low. The frame rate changing unit 735 converts the frame rate to be relatively high so that the quality of the ROI image may be set to be high.

According to an additional aspect of the present invention, the image processing unit 730 may extract a background object and a foreground object from the ROI image using a video analysis technology, and the ROI playing unit 720 may play an ROI image including only the background object, from which the foreground object has been removed.

For example, by providing a menu for "play only background image," when the menu for "play only background image" is selected by a user, the image processing unit 730 may play an image of an ROI including only a background object, from which a foreground object has been removed.

In this embodiment, since a product displayed in a shop may not be seen when people move or stay between the product and a camera, only the product, which is a background object, is shown by removing the people, which are the foreground objects.

According to an additional aspect of the present invention, the image processing unit 730 may recognize a person from an ROI image and perform a masking processing on the face of the recognized person.

For example, the image processing unit 730 may recognize a person among a plurality of objects that are present in an ROI and perform masking processing on the face of the recognized person.

In this embodiment, it is possible to protect personal information by providing online users with a shop image in which faces of customers who shop at an offline shop are masked to make the customers unidentifiable.

A shopping mall page provision operation performed by the personalized shopping mall system using the virtual camera according to an embodiment of the present invention, as described above, will be described with reference to FIGS. 11 to 14.

Figure 11:
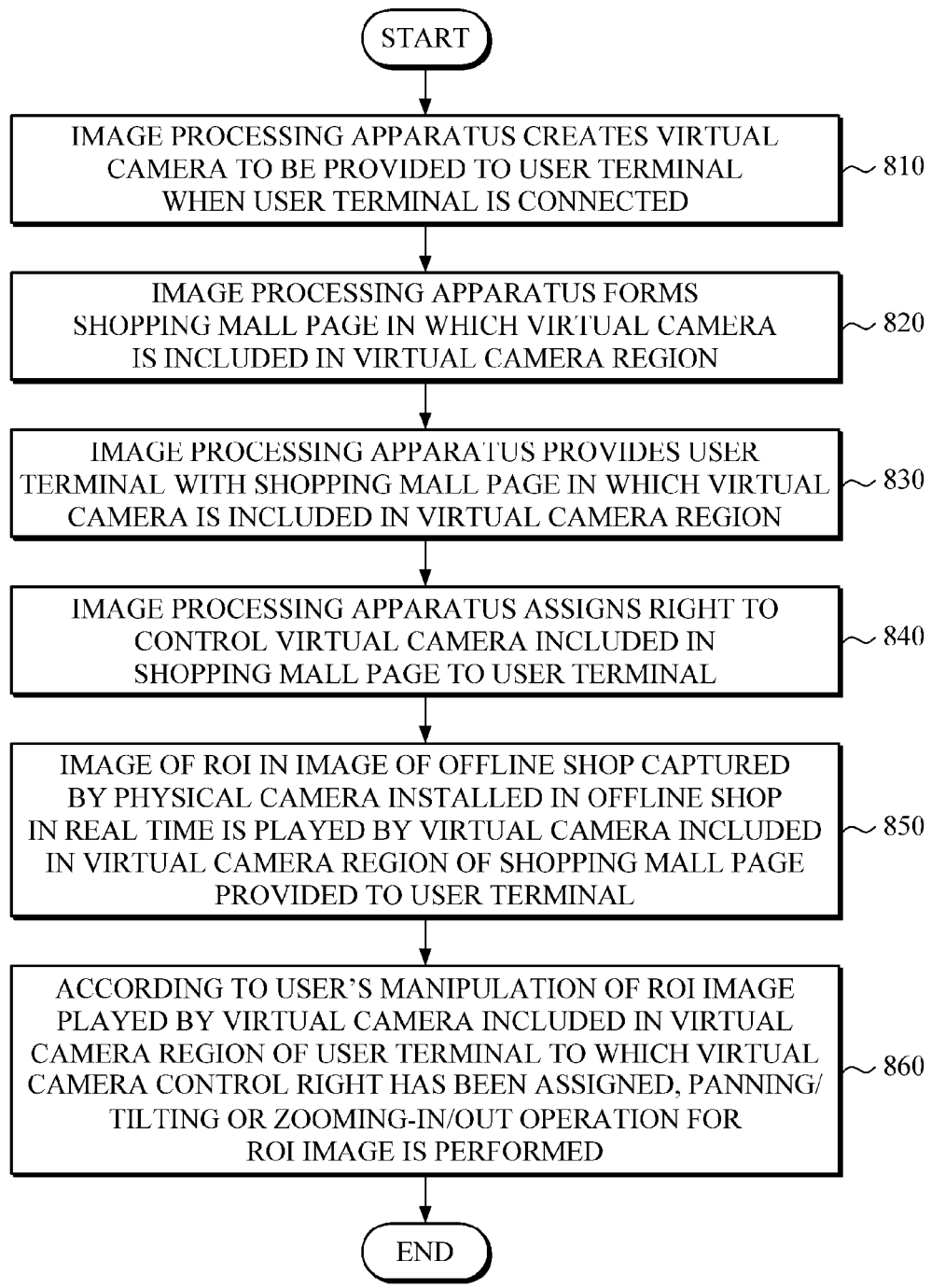
FIG. 11 is a flowchart showing an example of a shopping mall page providing operation of the personalized shopping mall system using the virtual camera shown in FIG. 1.

FIG. 11 is a flowchart showing an example of a shopping mall page providing operation of the personalized shopping mall system using the virtual camera shown in FIG. 1.

In step 810, first, when a user terminal is connected, an image processing apparatus creates a virtual camera to be provided to the user terminal.

In step 820, the image processing apparatus forms a shopping mall page in which the virtual camera, which is generated in step 810, is included in a virtual camera region.

In step 830, the image processing apparatus provides the user terminal with the shopping mall page, which is formed in step 820, in which the virtual camera is included in the virtual camera region.

In step 840, the image processing apparatus assigns a right to control the virtual camera included in the shopping mall page, which is provided in step 830, to the user terminal.

In step 850, an image of a region of interest (ROI) in an image of an offline shop captured by a physical camera installed in the offline shop in real time is played by the virtual camera included in the virtual camera region of the shopping mall page that is provided to the user terminal.

In step 860, according to a user's manipulation of the ROI image played by the virtual camera included in the virtual camera region of the user terminal to which the virtual camera control right has been assigned, a panning/tilting or zooming-in/out operation for the ROI image is performed.

Through such an implementation, the present invention can make a user feel as if he or she is actually visiting and shopping at the offline shop by creating a virtual camera having a different ROI from the image of the offline shop captured by the physical camera and streaming a shopping mall page including the virtual camera.

Figure 12:
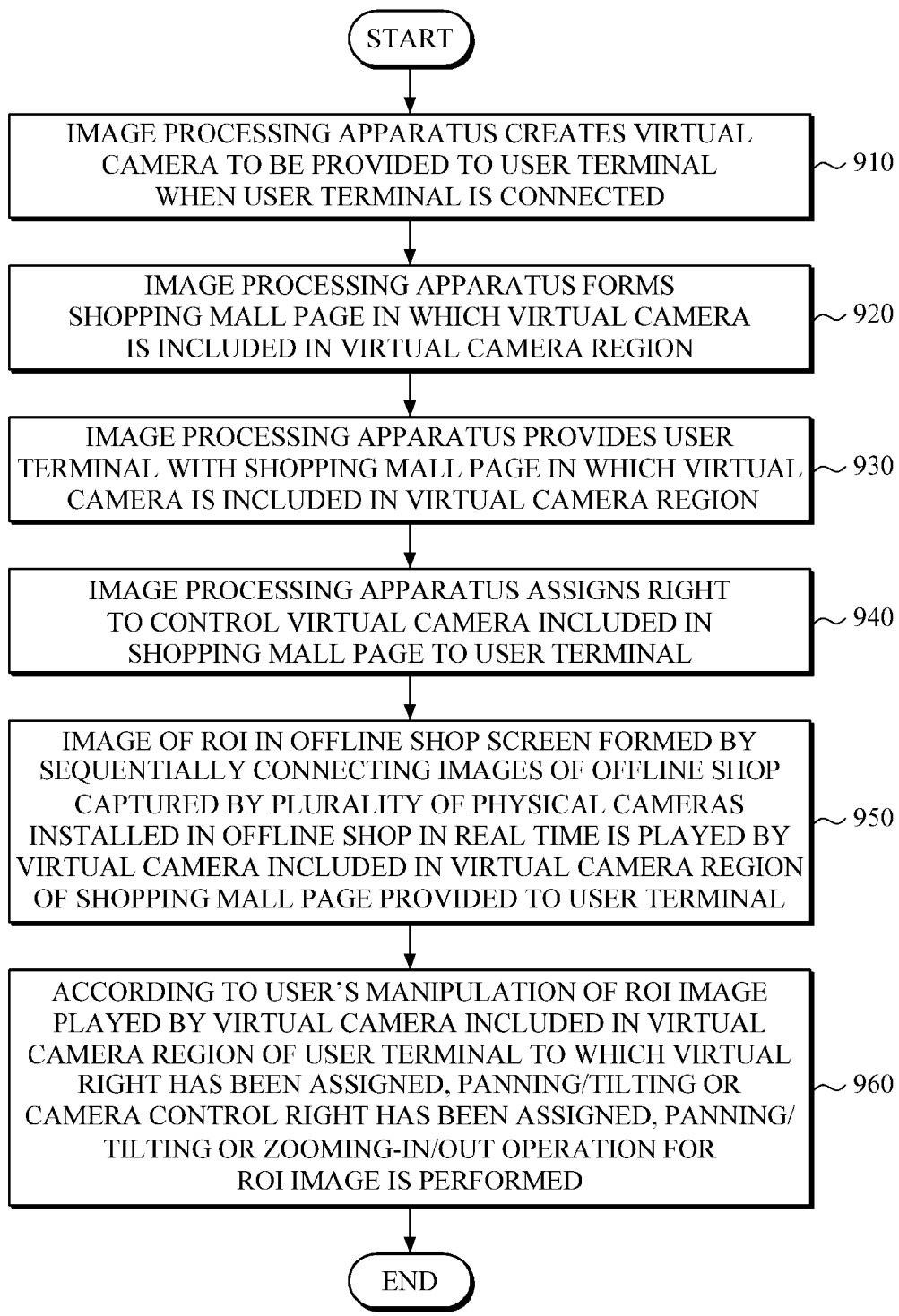
FIG. 12 is a flowchart showing an example of a shopping mall page providing operation of the personalized shopping mall system using the virtual camera shown in FIG. 2.

FIG. 12 is a flowchart showing an example of a shopping mall page providing operation of the personalized shopping mall system using the virtual camera shown in FIG. 2.

In step 910, first, when a user terminal is connected, an image processing apparatus creates a virtual camera to be provided to the user terminal.

In step 920, the image processing apparatus forms a shopping mall page in which the virtual camera, which is generated in step 910, is included in a virtual camera region.

In step 930, the image processing apparatus provides the user terminal with the shopping mall page, which is formed in step 920, in which the virtual camera is included in the virtual camera region.

In step 940, the image processing apparatus assigns a right to control the virtual camera included in the shopping mall page, which is provided in step 930, to the user terminal.

In step 950, an image of an ROI in an offline shop screen formed by sequentially connecting images of an offline shop captured by a plurality of physical cameras installed in the offline shop in real time is played by the virtual camera included in the virtual camera region of the shopping mall page that is provided to the user terminal.

In step 960, according to a user's manipulation of the ROI image played by the virtual camera included in the virtual camera region of the user terminal to which the virtual camera control right has been assigned, a panning/tilting or zooming-in/out operation for the ROI image is performed.

Through such an implementation, the present invention can make a user feel as if he or she is actually visiting and shopping at the offline shop by creating a virtual camera having a different ROI from the offline shop screen formed by sequentially connecting the images of the offline shop captured by the plurality of physical cameras and streaming a shopping mall page including the virtual camera.

Figure 13:
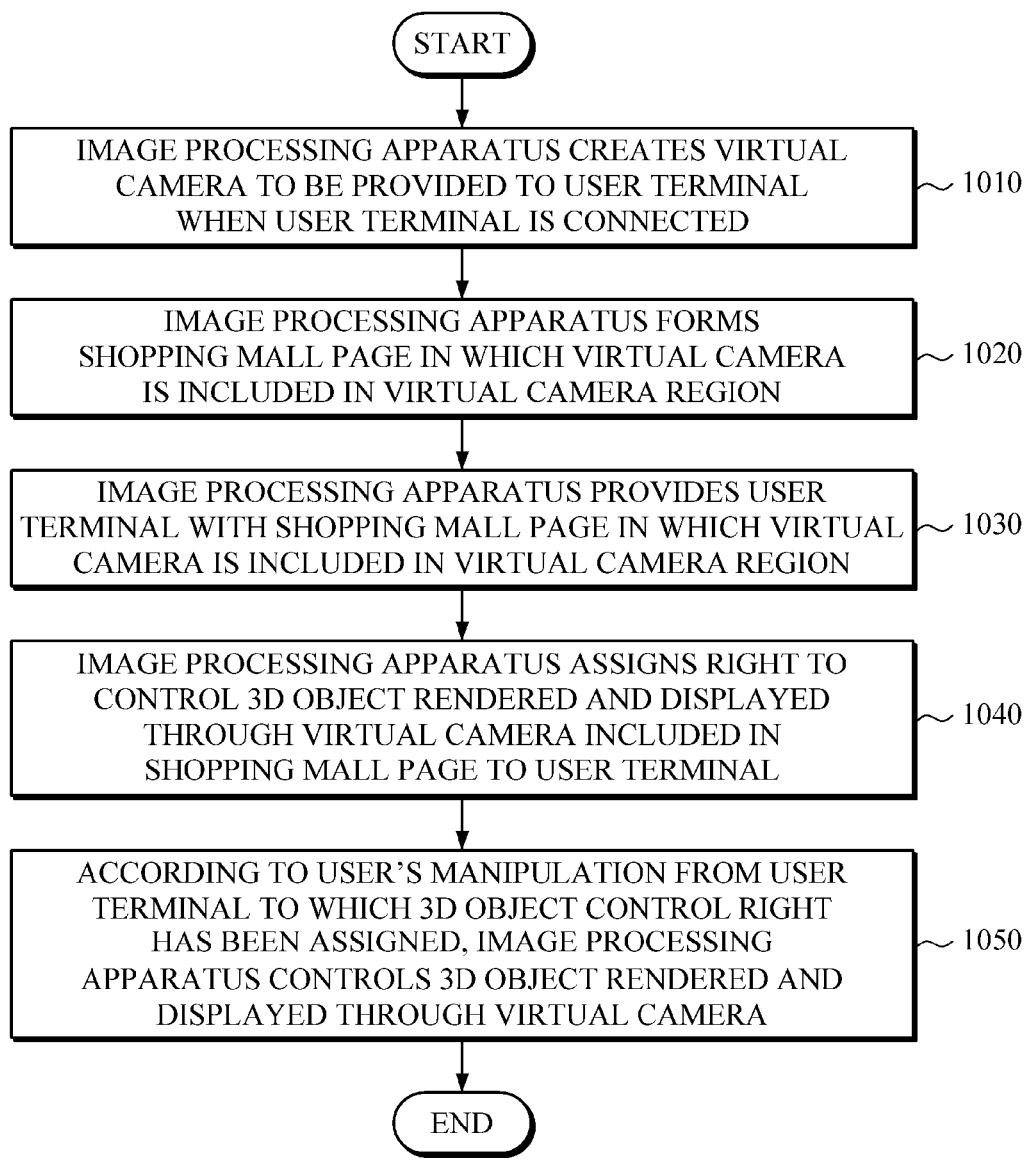
FIG. 13 is a flowchart showing an example of a shopping mall page providing operation of the personalized shopping mall system using the virtual camera shown in FIG. 5.

FIG. 13 is a flowchart showing an example of a shopping mall page providing an operation of the personalized shopping mall system using the virtual camera shown in FIG. 5.

In step 1010, first, when a user terminal is connected, an image processing apparatus creates a virtual camera to be provided to the user terminal.

In step 1020, the image processing apparatus forms a shopping mall page in which the virtual camera, which is generated in step 1010, is included in a virtual camera region.

Here, the virtual camera region of the shopping mall page may include a specific 3D object selected from among 3D objects detected using a stereo disparity between 2D images of an offline shop captured by a plurality of physical cameras that are disposed adjacent to each other.

In step 1030, the image processing apparatus provides the user terminal with the shopping mall page, which is formed in step 1020, in which the virtual camera is included in the virtual camera region. Here, the 3D object is rendered and displayed through the virtual camera included in the shopping mall page.

In step 1040, the image processing apparatus assigns a right to control the 3D object rendered and displayed through the virtual camera included in the shopping mall page, which is provided in step 1030, to the user terminal.

In step 1050, according to a user's manipulation from the user terminal to which the 3D object control right has been assigned, the image processing apparatus controls the 3D object rendered and displayed through the virtual camera.

Here, the control of the 3D object may be a control of rotating of, zooming-in/out on, or panning/tilting of the 3D object rendered and displayed by the virtual camera.

Through such an implementation, the present invention can make a user feel as if he or she is actually visiting and shopping at the offline shop by creating a plurality of different virtual cameras having regions in which 3D objects, which are detected using a stereo disparity between 2D images of the offline shop captured by a plurality of physical cameras disposed adjacent to each other and configured to capture shop images in real time, are located as ROIs from an offline shop screen including the 3D objects and streaming a shopping mall page including the virtual cameras.

FIG. 14 is a flowchart showing an example of a shopping mall page providing operation of the personalized shopping mall system using the virtual camera shown in FIG. 7.

In step 1110, first, when a user terminal is connected, an image processing apparatus creates a virtual camera to be provided to the user terminal.

In step 1120, the image processing apparatus forms a shopping mall page in which the virtual camera, which is generated in step 1110, is included in a virtual camera region.

In step 1130, the image processing apparatus provides the user terminal with the shopping mall page, which is formed in step 1120, in which the virtual camera is included in the virtual camera region.

In step 1140, the image processing apparatus assigns a right to control the virtual camera included in the shopping mall page, which is provided in step 1130, to the user terminal.

An image of an ROI in an image of an offline shop captured by a physical camera installed in the offline shop in real time is played by the virtual camera included in the virtual camera region of the shopping mall page that is provided to the user terminal.

In step 1150, depending on a streaming load of a local server, ROI images played by the virtual cameras are streamed directly by the local server or indirectly through a dedicated streaming server.

In step 1160, according to a user's manipulation of the ROI image played by the virtual camera included in the virtual camera region of the user terminal to which the virtual camera control right has been assigned, a panning/tilting or zooming-in/out operation for the ROI image is performed.

Through such a configuration, the present invention can quickly provide a shopping mall page that makes a user feel as if he or she is visiting and shopping at an offline shop by creating virtual cameras having different ROIs from an image of the offline shop captured by a physical camera, providing a shopping mall page including each of the created virtual cameras, and distributing a steaming load of ROI images played by the virtual cameras, which are included in virtual camera regions of shopping mall pages.

An ROI extraction operation of the virtual camera of the personalized shopping mall system using the virtual camera according to an embodiment of the present invention will be described with reference to FIG. 15. FIG. 15 is a flowchart showing an example of an ROI extraction procedure performed by the virtual camera shown in FIG. 10.

In step 1210, first, a virtual camera receives virtual camera setting information from a user and stores the received virtual camera setting information. For example, the virtual camera setting information may include at least one of an initial ROI location, an ROI size, resolution, quality, a compression format, and a virtual camera region pattern.

In step 1220, the virtual camera determines an initial ROI location included in the virtual camera setting information as an ROI, extracts a part corresponding to the ROI from a shop image received from a physical camera in the ROI size, and plays the corresponding part.

In step 1230, when a user performs a manipulation of panning/tilting or zooming-in/out, the virtual camera pans/tilts or zooms in/out on an image of the ROI played by the virtual camera in a range of the virtual camera region by software.

In step 1240, when the ROI image played by the manipulation of panning/tilting or zooming-in/out from the user goes beyond the range of the virtual camera region (a physical camera capturing range), the virtual camera outputs, to the physical camera, a physical camera driving command to pan/tilt the physical camera or have the physical camera zoom in/out.

As described above, the present invention can make a user feel as if he or she is actually visiting and shopping at the offline shop by creating a virtual camera having a different ROI from an image of an offline shop captured by one physical camera and streaming a shopping mall page including the virtual camera.

In addition, the present invention can make a user feel as if he or she is actually visiting and shopping at the offline shop by creating a virtual camera having a different ROI from the offline shop screen formed by sequentially connecting the images of the offline shop captured by the plurality of physical cameras and streaming a shopping mall page including the virtual camera.

In addition, the present invention can make a user feel as if he or she is actually visiting and shopping at the offline shop by creating a plurality of different virtual cameras having regions in which 3D objects, which are detected using a stereo disparity between 2D images of the offline shop captured by a plurality of physical cameras disposed adjacent to each other and configured to capture shop images in real time, are located as ROIs from an offline shop screen including the 3D objects and streaming a shopping mall page including the virtual cameras.

In addition, the present invention can quickly provide a shopping mall page that makes a user feel as if he or she is visiting and shopping at an offline shop by creating virtual cameras having different ROIs from an image of the offline shop captured by a physical camera, providing a shopping mall page including each of the created virtual cameras, and distributing a steaming load of ROI images played by the virtual cameras, which are included in virtual camera regions of shopping mall pages.

The present invention can make a user feel as if he or she is actually visiting and shopping at the offline shop by creating a virtual camera having a different ROI from an image of an offline shop captured by one physical camera and streaming a shopping mall page including the virtual camera.

In addition, the present invention can make a user feel as if he or she is actually visiting and shopped at the offline shop by creating a virtual camera having a different ROI from the offline shop screen formed by sequentially connecting the images of the offline shop captured by the plurality of physical cameras and streaming a shopping mall page including the virtual camera.

In addition, the present invention can make a user feel as if he or she is actually visiting and shopping at the offline shop by creating a plurality of different virtual cameras having regions in which 3D objects, which are detected using a stereo disparity between 2D images of the offline shop captured by a plurality of physical cameras disposed adjacent to each other and configured to capture shop images in real time, are located as ROIs from an offline shop screen including the 3D objects and streaming a shopping mall page including the virtual cameras.

In addition, the present invention can quickly provide a shopping mall page that makes a user feel as if he or she is visiting and shopping at an offline shop by creating virtual cameras having different ROIs from an image of the offline shop captured by a physical camera, providing a shopping mall page including each of the created virtual cameras, and distributing a steaming load of ROI images played by the virtual cameras, which are included in virtual camera regions of shopping mall pages.

While the present invention has been described with preferred embodiments in conjunction with the accompanying drawings, it is obvious that various modifications can be made without departing from the scope of the present invention as defined by the following claims.

What is claimed is:

1. A personalized shopping mall system using a virtual camera, the personalized shopping mall system comprises:
   a physical camera configured to capture an image of an offline shop in real time;
   an image processing apparatus comprising:
      an image receiving unit configured to receive the image of the offline shop captured by the physical camera; and
      a virtual camera management unit configured to generate a plurality of virtual cameras, which crop images of specific regions of interest (ROIs) in which a user has an interest, having different ROIs from the image of the offline shop received by the image receiving unit; and
   a virtual camera comprising:
      an ROI selection unit configured to select an ROI from the image of the off line shop captured by the physical camera;
      an ROI playing unit configured to play an image of the ROI selected by the ROI selection unit; and
      an image processing unit configured to perform panning/tilting or zooming-in/out processing of the image of the ROI played by the ROI playing unit according to a manipulation of a user terminal,
   wherein the virtual camera management unit comprises:
      a connection management unit configured to process connection and disconnection of the user terminal;
      a virtual camera creation unit configured to generate a virtual camera from among the virtual cameras to be provided to a user terminal that is allowed to be connected by the connection management unit;
      a shopping mall page creation unit configured to form a shopping mall page in which the virtual camera created by the virtual camera creation unit is included in a virtual camera region;
      a shopping mall page provision unit configured to provide the user terminal with the shopping mall page created by the shopping mall age creation unit in which the virtual camera is included in the virtual camera region; and
      a control right assignment unit configured to assign a right to control the virtual camera included in the shopping mall page provided by the shopping mall page provision unit to the user terminal.

2. The personalized shopping mall system of claim 1, wherein the physical camera is provided in plurality.

3. The personalized shopping mall system of claim 2, wherein the virtual camera management unit forms an integrated offline shop screen by sequentially connecting images of the off line shop captured by the plurality of physical cameras and generates the plurality of virtual cameras having different ROIs from the formed offline shop screen.

4. The personalized shopping mall system of claim 1, wherein the right to control the virtual camera is an authority to pan/tilt or zoom in/out on a virtual camera screen.

5. The personalized shopping mall system of claim 1, wherein the shopping mall page created by the shopping mall page creation unit includes a product of interest (POI) region in which an image of the POI product uploaded by a manager terminal is registered.

6. The personalized shopping mall system of claim 1, wherein the shopping mall page created by the shopping mall page creation unit includes a video chatting region in which video chatting between a manager terminal and the user terminal is processed.

7. The personalized shopping mall system of claim 1, wherein the shopping mall page created by the shopping mall page creation unit includes a shop information region in which off line shop information is provided.

8. The personalized shopping mall system of claim 1, wherein the virtual camera further comprises a simulative panning/tilting/zooming processing unit configured to output, to the image processing unit, a virtual camera control command to pan/tilt or zoom in/out on the ROI image played by the ROI playing unit in a range of the virtual camera region by software, according to a manipulation signal for panning/tilting or zooming-in/out.

9. The personalized shopping mall system of claim 8, wherein the virtual camera further comprises an optical panning/tilting/zooming processing unit configured to output, to the physical camera, a physical camera driving command to pan/tilt the physical camera or have the physical camera zoom in/out when the ROI image played by the ROI playing unit goes beyond the range of the virtual camera region.

10. The personalized shopping mall system of claim 1, wherein the virtual camera further comprises:
a setting information storage unit configured to store virtual camera setting information; and
a virtual camera setting unit configured to receive the virtual camera setting information from a user.

11. The personalized shopping mall system of claim 10, wherein the virtual camera setting unit sets at least one of an initial ROI location, an ROI size, resolution, quality, a compression format, and a virtual camera region pattern as the virtual camera setting information.

12. The personalized shopping mall system of claim 10, wherein the image processing unit comprises:
a memory configured to store the shop image captured by the physical camera;
an ROI extraction unit configured to extract an ROI image of the ROI selected by the ROI selection unit from the shop image stored in the memory;
an image scaler configured to convert the ROI image extracted by the ROI extraction unit into the resolution included in the camera setting information; and
a codec configured to compress the ROI image converted by the image scaler in the compression format included in the camera setting information.

13. The personalized shopping mall system of claim 12, wherein the image processing unit further comprises a frame rate changing unit configured to change a frame rate to be suitable for the quality included in the camera setting information.

14. The personalized shopping mall system of claim 1, wherein the image processing unit extracts a background object and a foreground object from the ROI image and performs processing such that an image of an ROI including only the background object, from which the foreground object has been removed, is played through the ROI playing unit.

15. The personalized shopping mall system of claim 1, wherein the image processing unit recognizes a person from the ROI image and performs masking processing on the face of the recognized person.

16. The personalized shopping mall system of claim 1, wherein ROIs selected by the ROI selection unit overlap with one another.

17. The personalized shopping mall system of claim 1, wherein the image processing apparatus further comprises:
a multiplexing unit configured to convert the ROI images played by the plurality of virtual cameras into packet image signals originated from different ports having the same network address and multiplex the packet image signals into a single packet image stream; and
an image transmission unit configured to transmit the single packet image stream obtained by the multiplexing through the multiplexing unit to user terminals through a single physical layer.

18. The personalized shopping mall system of claim 1, wherein the virtual camera management unit further comprises a control right reclaiming unit configured to reclaim the virtual camera control right assigned to the user terminal that is allowed to be disconnected by the connection management unit.

19. The personalized shopping mall system of claim 2, wherein the plurality of physical cameras are installed in a row.

20. The personalized shopping mall system of claim 2, wherein the plurality of physical cameras are installed in a radial pattern.

21. The personalized shopping mall system of claim 2, wherein the virtual camera management unit connects the images of the offline shops such that the images partially overlap with one another.

* * * * *